United States Patent [19]

Sugo et al.

[11] Patent Number: 4,622,366
[45] Date of Patent: Nov. 11, 1986

[54] URANIUM ADSORBING MATERIAL AND PROCESS FOR PREPARING THE SAME

[75] Inventors: Takanobu Sugo; Jiro Okamoto; Isao Ishigaki; Akio Katakai, all of Gunma, Japan

[73] Assignee: Japan Atomic Energy Research Institute, Tokyo, Japan

[21] Appl. No.: 676,209

[22] Filed: Nov. 28, 1984

Related U.S. Application Data

[63] Continuation-in-part of Ser. No. 496,645, May 20, 1983, abandoned.

[30] Foreign Application Priority Data

May 26, 1982 [JP] Japan .................................. 57-89360

[51] Int. Cl.[4] ........................... C08F 8/32; C08F 2/54; C08D 5/20
[52] U.S. Cl. .................................... 525/380; 527/312; 204/157.44; 204/157.45; 204/157.47; 204/157.51; 204/157.63; 204/157.64; 204/157.68; 8/115.52; 522/114; 522/115; 522/116; 522/118; 522/120; 522/135; 522/136; 522/139; 522/144; 525/377

[58] Field of Search ............... 521/27, 32; 204/159.15, 204/159.22; 525/380; 527/312

[56] References Cited

U.S. PATENT DOCUMENTS

| 2,865,872 | 12/1958 | Hagemeyer et al. | 527/312 |
| 3,063,950 | 11/1962 | Schouteden | 54/32 |
| 3,063,951 | 11/1962 | Schouteden | 521/32 |
| 3,088,798 | 5/1963 | Fetscher | 521/32 |
| 3,322,661 | 5/1967 | Yoshikawa et al. | 204/159.17 |
| 3,376,168 | 4/1968 | Horowitz | 521/27 |
| 4,288,467 | 9/1981 | Machi et al. | 427/44 |

OTHER PUBLICATIONS

Polymer Science, vol. 14, pp. 3113–3128 (1970), Harris et al.

Primary Examiner—Joseph L. Schofer
Assistant Examiner—Peter F. Kulkosky
Attorney, Agent, or Firm—Browdy and Neimark

[57] ABSTRACT

A uranium adsorbing material made of a graft polymer with a graft ratio of 20 to 100% which contains amidoxime groups and cation exchange groups in a molar ratio of 1:1 to 20:1 and a process for preparing said material are herein disclosed.

16 Claims, No Drawings

URANIUM ADSORBING MATERIAL AND PROCESS FOR PREPARING THE SAME

This application is a continuation-in-part of application Ser. No. 496,645 filed May 20, 1983, and now abandoned.

BACKGROUND OF THE INVENTION (1) Field of the Invention

The present invention relates to a material capable of selective and efficient adsorption of uranium dissolved in aqueous solution, as well as a process for preparing said material.

(2) Description of Prior Art

In Japan where natural resources are scarce, recovery of valuable materials present in trace amounts from water-courses, sea water and mining wastewater is important not only for environmental protection but also for efficient use of resources. Among the many separating techniques so far proposed, an adsorbent made of a compound capable of forming a complex with the desired ionic specides is useful in selective separation and recovery of heavy metal salts dissolved in aqueous solutions. The material for adsorbing uranium present in a trace amount in sea water or mining wastewater must meet the following requirements: (a) high adsorption rate and capacity; (b) high selectivity for uranium adsorption; (c) usability at the temperature, pH and NaCl concentration of natural sea water; (d) low solubility in and chemical stability against sea water and desorbing liquor; (e) adaptability to cyclic use after desorption; and (f) low unit price and suitability for mass production. In an attempt at developing an adsorbent that satisfies all these requirements, a legion of inorganic and organic compounds have been studied by British, Japanese and West German scientists for their uranium adsorbing capabilities. In the earlier studies, several resins were reviewed as organic adsorbents that could be used in recovering uranium from sea water. Some resins (e.g. resorcinol acid/formaldehyde copolymer) were found to have high adsorption capacity but thereafter, they were found to be labile in sea water and gradually decompose, so researchers had no more interest in using them as uranium adsorbents. At a later time, macrocyclic hexaketones and hexacarboxylic acids were developed. In sea water, uranium is present in anionic form in a complex, so an attempt was made to recover uranium by an anion exchange resin, but no appreciable results were obtained. Noting the ability of a chelate agent to form a complex with heavy metal ions, researchers synthesized chelate resins as agents for recovering heavy metals from aqueous solutions. Among the chelates studied, those having an amidoxime group

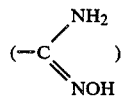

were found to have a particularly high selectivity for adsorbing uranium in sea water. Organic polymer compounds can be shaped more easily than inorganic compounds, but in order to use the above listed organic compounds as uranium adsorbents, they must be either supported on water-insoluble polymers or provided with a crosslinking structure, and several problems remain unsolved with this requirement. For example, macrocyclic hexaketones or hexacarboxylic acids must be supported on a polymer such as polystyrene. An amidoxime containing chelate resin is produced by first preparing a polymer containing a nitrile group and then converting said nitrile group into an amidoxime group, and conventionally, this resin has been used in the form of a copolymer with a polyfunctional monomer such as divinylbenzene in order to provide the resin with the mechanical strength and resistance to swelling necessary for using it as an adsorbent. However, depending upon the proportions of the monomers, the molecular weight of the copolymer, and the density of the bridges introduced, it often occurs that great difficulty is involved in shaping the copolymer in a desired from such as particles, fibers, web or membrane.

SUMMARY OF THE INVENTION

An object of the present invention is to provide a uranium adsorbent in a desired form which includes both cation exchange and amidoxime groups in a substrate and which has very good characteristics in respect to adsorption performance, mechanical properties and durability.

Another object of the present invention is to provide a uranium adsorbing material made of a graft polymer with a graft ratio of 20 to 100% which contains amidoxime groups and cation exchange groups in a molar ratio of 1:1 to 20:1, preferably 1:1 to 3:1.

Further object of the present invention is to provide a process for producing said uranium adsorbent.

Other objects of the present invention will become apparent from the following description.

DETAILED DESCRIPTION OF THE INVENTION

The present invention relates to a material capable of selective and efficient adsorption of uranium dissolved in a aqueous solution, as well as a process for preparing said material. More particularly, the present invention relates to a uranium adsorbing material made of a graft polymer with a graft ratio of 20 to 100% which contains amidoxime groups and cation exchange groups in a molar ratio of 1:1 to 3:1 as well as a process for preparing said material.

We have been engaged in using the radiation-initiated grafting technique to produce an adsorbent for heavy metals that is free from the defects of the conventional product and has higher adsorption performance. In the course of this study, we have found that an adsorbent having a very high adsorption performance is produced by a method which includes first grafting onto a substrate a first polymerizable monomer having a cation exchange group or a functional group capable of conversion to a cation exchange group, and then grafting onto the substrate a second polymerizable monomer having a functional group, e.g. a nitrile group, capable of conversion to an amidoxime group; the grafted polymer is subjected to a suitable treatment for introducing the cation exchange groups into the monomer, if not already present, and for converting the nitrile group to amidoxime. The present invention has been accomplished on the basis of this finding.

The process of the present invention for producing a uranium adsorbing material comprises first irradiating a substrate of a desired shape made of an organic, inorganic or composite material with an ionizing radiation and bringing the irradiated substrate into contact with at least one first polymerizable monomer at least one first polymerizable monomer containing a cation exchange group or a functional group that can be converted to a cation exchange group, and then into contact with a second polymerizable monomer containing a nitrile group which can be converted to an amidoxime group by reacting said monomer with an hydroxylamine, or irradiating such substrate with ionizing radiation while it is in contact with said polymerizable monomers in series, to thereby prepare a graft polymer having said polymerizable monomers grafted onto said substrate; if the first polymerizable monomer has a functional group capable of conversion to a cation exchange group, reacting it with an alkyl so as to introduce cation exchange groups into the graft chain, and reacting the graft monomer with an hydroxylamine so as to introduce amidoxime groups into the graft chain. It is indispensible to introduce cation exchange groups and amidoxime groups separately into the substrate the use of a two step-graft polymerization.

The substrate for the adsorbent that can be used in the present invention may be any inorganic or organic compound or composite material thereof onto which monomers can be grafted by radiation-initiated polymerization. Suitable inorganic substrates are silica gel, alumina and activated carbon. Suitable organic substrates include synthetic and natural polymers such as polyolefins, halogen-containing polyolefins, polyesters, polyethers and celluloses. These substrates may assume any shape such as particles, fibers, membranes, tubes and rods, and they may be processed into webs, screens, twisted yarns or mats. For the purpose of the present invention, a substrate that is so designed as to have high mechanical strength and great resistance to sea water and chemicals and which has a shape providing a large specific surface area and is adapted to cycles of adsorption and desorption is preferred.

Examples of the polymerizable monomer that contains a nitrile group which can be converted to an amidoxime group by reaction with a hydroxylamine include acrylonitrile, cyanated vinylidene, crotonnitrile, methacrylonitrile, chloroacrylonitrile, 2-cyanoethylacrylate and 2-cyanoethylmethacrylate. These monomers may be used either alone or in combination.

Examples of the polymerizable monomer that contains a cation exchange group or a functional group capable of conversion to a cation exchange group are hydrocarbon or halogen-containing monomers having at least one member of the group consisting of a sulfonic acid group, carboxylic acid group, phenolic hydroxyl group and a phosphonic acid group; specific examples include vinylsulfonic acid, styrene-sulfonic acid, acrylic acid, methacrylic acid, fluorovinylsulfonic acid and fluorovinylcarboxylic acid, as well as alkali metal salts, methyl or ethyl esters, chlorides, and fluorides of these acids. These monomers may be used either alone or in combination.

Sources of the radiation that can be used to initiate the graft polymerization in the process of the present invention include alpha-rays, beta-rays, gamma-rays, accelerated electron beams and X-rays. For practical purposes, electron beams and X-rays are preferred.

The polymerizable monomers can be grafted onto the substrate by irradiating the substrate together with each of the monomers serially, or by first irradiating the substrate which is then brought into contact with the monomers in series. To achieve the desired proportions of cation exchange and amidoxime group and graft ratio which will be described later, the dose, temperature and period of irradiation should be properly determined depending upon the method of grafting, the gel fraction of radicals formed in the substrate, their stability and the reactivity of the monomers to form grafts. If the nature of the substrate and monomers so require, the grafting reaction may proceed in the presence of a solvent.

The monomers must be grafted onto the substrate sequentially, i.e. first one and then the other, and it is preferred that the monomer containing a cation exchange group or a functional group capable of conversion to a cation exchange group be grafted onto the substrate first, followed by grafting of the monomer having a functional group capable of conversion to an amidoxime group. The conversion of the functional group in the graft chain to an amidoxime group, or to a cation exchange group (if a monomer containing a functional group capable of conversion to a cation exchange group is used) may be effected at any of the steps following the graft polymerization, without adversely affecting the object of the present invention. The functional group in the graft polymer may be converted to an amidoxime group by any known method using a hydroxylamine. More specifically, the graft polymer is immersed in a solution of a hydroxlyamine salt and heated at 40°–80° C. for 4–10 hours. Suitable solvents are water, dimethylformamide, dimethylsulfoxide, methyl or ethyl alcohol and tetrahydrofuran, which may be used either alone or in combination. Examples of the hydroxylamine salt are hydroxylamine hydrochloride, sulfate and acetate, which are used at a concentration of 3–6%. If a monomer containing a functional group capable of conversion to a cation exchange group is used, the functional group must be converted to a cation exchange group after the monomer is grafted onto the substrate, and this may be accomplished by a known method using an aqueous solution of an alkali. More specifically, the graft polymer is immersed in a 2.5–20% solution of NaOH or KOH in water, water-alcohol or water-dimethylsulfoxide, and heated at temperatures from room temperature to 100° C. for a period of 5 minutes to 16 hours.

In order to provide a uranium adsorbing material that has high adsorption performance, high mechanical strength and great durability, the molar ratio of cation exchange groups to amidoxime groups in the graft chain preferably ranges from 1:1 to 1:3, and the graft ratio (the weight of the graft polymer/the weight of the substrate $\times 100$) is preferably in the range of 20 to 100%.

The advantages of the present invention will become more apparent by reading the following examples, to which the scope of the invention is by no means limited.

EXAMPLE 1

Fiber filaments (40 $\mu m\phi$) of tetrafluoroethylene-ethylene copolymer ("AFRON" by Asahi Chemical Industry Co., Ltd.) were irradiated with an electron beam from an accelerator (acceleration voltage: 1.5 MeV, current: 1 mA) in a nitrogen atmosphere to give a total dose of 10 Mrad. The irradiated filaments were immersed in a 50 wt% aqueous solution of acrylic acid (AAc) that contained 0.25 wt% Mohr's salt and which had been bubbled with nitrogen gas to reduce the concentration of dissolved oxygen to not more than 0.1 ppm, and the solution was heated at 25° C. for one hour. The resulting filaments had an AAc graft ratio of 1.3.5%. They were subsequently irradiated with an electron beam to give a total dose of 10 Mrad and immersed in a 50 wt% aqueous solution of acrylonitrile (AN) at 25° C. for 6 hours to produce filaments with an AN graft ratio of 50%.

The filaments were neutralized with potassium hydroxide and then immersed in a 3 wt% hydroxylamine hydrochloride in water-methanol (1:1 by volume) at 80° C. for 6 hours. The adsorbing material thus produced had an anion exchange capacity of 5.4 meq/g in terms of the concentration of amidoxime groups.

A measured amount (0.1 g) of the adsorbent was immersed in 5.0 ml of sea water to which uranyl nitrate was added to adjust the uranium concentration to 1 mg/1,000 ml, and the solution was shaken at 30° C. for one hour to adsorb uranium on the adsorbent. The uranium adsorption was 48.6 μg/0.1 g-adsorbent, and the adsorption efficiency was 97.2%.

A control adsorbent was prepared by repeating the above procedure except that only AN was grafted onto the substrate. The adsorbent had a graft ratio of 54% and an anion exchange capacity of 2.8 meq/g. The adsorbent was then subjected to a uranium adsorption test under the same conditions as used above: the uranium adsorption was 26.0 μg/0.1 g-adsorbent, and the adsorption efficiency was 52%.

EXAMPLE 2

A low-density polyethylene powder comprising particles with an average size of 30 μm were irradiated with an electron beam in a nitrogen atmosphere to give a total dose of 10 Mrad. The irradiated polyethylene particles were immersed in a liquid mixture of AN and methacrylic acid (MA) (8:2 by volume) at 25° C. for 6 hours. The concentration of dissolved oxygen in the AN-MA liquid mixture had been adjusted to not more than 0.1 ppm. The resulting powder had a graft ratio of 42%. The acrylonitrile group in the graft chain was converted to an amidoxime group as in Example 1. A metered amount (0.1 g) of the powder was used to adsorb uranium as in Example 1. The powder (adsorbent) had an anion exchange capacity of 4.9 meq/g, a uranium adsorption of 49.0 μg/0.1 g-adsorbent, and an adsorption efficiency of 98%.

EXAMPLE 3

A glass container was filled with chromatographic silica gel particles (av. size = 10 μm) and a liquid mixture of vinylsulfonic acid and methacrylonitrile (1:9 by volume), and following five freeze-drying cycles under vacuum, the container was sealed. While the container was held at room temperature, the contents were irradiated with gamma-rays from Co-60 for 3 hours at a dose rate of $1 \times 10^4$ rad/hr. A graft polymer having a graft ratio of 17% was obtained. The acrylonitrile in the graft chain was converted to an amidoxime group as in Example 1, and the so prepared adsorbent was subjected to a uranium adsorption test as in Example 1. The adsorbent had an anion exchange capacity of 2.3 meq/g, a uranium adsorption of 47.5 μg/0.1 g-adsorbent, and an adsorption efficiency of 95%.

A control adsorbent was prepared by repeating the above procedure except that only methacrylonitrile was grafted onto the silica gel particles. The resulting graft polymer had a graft ratio of 25% and an anion exchange capacity of 1.1 meq/g. The adsorbent was then subjected to a uranium adsorption test under the same conditions as used above: the uranium adsorption was 23.5 μg/0.1 g-adsorbent and the adsorption efficiency was 47%.

EXAMPLE 4

Low-density polyethylene strips (50 μm thick, 2 mm wide, 1.5 cm long) were immersed in a 30 vol% solution of methyl trifluoroacrylate (MTFA) in Freon R 113. After freeze-drying under vacuum, the reaction system was irradiated with gamma-rays from Co-60 for 16 hours at a dose rate of $1 \times 10^5$ rad/hr. The resulting graft polymer had a graft ratio of 23%. It was immersed in a 2.5% solution of NaOH in a liquid mixture of water and dimethylsulfoxide (1:1 by volume) and refluxed for 16 hours to hydrolyze the ester groups in MTFA into carboxyl groups. The polymer was further irradiated with an electron beam in a nitrogen atmosphere to give a total dose of 10 Mrad. The irradiated polymer was put into a 50 wt% solution of AN in methanol, where it was held at 30° C. for 5 hours to graft AN onto the polyethylene strips. The AN graft ratio of the polymer was 52%.

The acrylonitrile group in AN was converted to an amidoxime group as in Example 1, and the so prepared adsorbent was subjected to a uranium adsorption test as in Example 1. The adsorbent had an anion exchange capacity of 5.3 meq/g, a uranium adsorption of 47.2 μg/0.1 g-adsorbent, and an adsorption efficiency of 94%.

A control adsorbent was prepared by repeating the above procedures except that only AN was grafted onto the polyethylene strips. The resulting graft polymer had an anion exchange capacity of 1.8 meq/g, a uranium adsorption of 21.5 μg/0.1 g-adsorbent and an adsorption efficiency of 43%.

EXAMPLE 5-8 AND COMPARATIVE EXAMPLES 1-5

The table below contains the experimental conditions and the results obtained in these examples. Each of the products was tested to determine uranium adsorption which is given in the last column. The abbreviation AAc stands for acrylic acid and the abbreviation An stand for acrylonitrile. Comparative example 2 is consistent with example 7 of the Shoutenden U.S. Pat. No. 3,063,950 wherein AAc and AN are simultaneously grafted onto the substrate.

TABLE

| | | first step graft polymerization | | | | second step graft poly. | | | | amidoxime group meq/g. | Uranium adsorption % |
|---|---|---|---|---|---|---|---|---|---|---|---|
| | | | polymerization condition | | graft | | polymerization condition | | graft | | |
| | Substrate | monomer | Mrad. | hr. | ratio | monomer | Mrad. | hr. | ratio | | |
| Ex. 5 | TFE-E*[1] Fiber (40 μm φ) | AAc | 10 | 1 | 13.5 | AN | 10 | 6 | 50 | 5.4 | 97.2 |
| Com. Ex. 1 | " | AN | 10 | 6 | 54 | — | — | — | — | 2.8 | 52.0 |
| Ex. 6 | PE*[2] Fiber (40 μm φ) | AAc | 10 | 1.5 | 15.0 | AN | 10 | 6 | 53 | 5.2 | 96.5 |
| Com. Ex. 2 | " | AAc:AN 15:85 | 10 | 6 | 53.6 | — | — | — | — | 4.8 | 70.0 |
| Ex. 7 | PE Powder | MAAc*[3] | 10 | 2 | 12.5 | AN | 10 | 6 | 47 | 4.2 | 95.7 |
| Com. Ex. 3 | " | AN | 10 | 6 | 54 | MAAc | 10 | 2 | 8 | 2.5 | 80.0 |

TABLE-continued

| | | first step graft polymerization | | | | second step graft poly. | | | | amidoxime group meq/g. | Uranium adsorption % |
| | | | polymerization condition | | graft ratio | | polymerization condition | | graft ratio | | |
| | Substrate | monomer | Mrad. | hr. | | monomer | Mrad. | hr. | | | |
| --- | --- | --- | --- | --- | --- | --- | --- | --- | --- | --- | --- |
| Ex. 8 | PE Film (25 μm thick) | AAc | 10 | 2.0 | 16 | AN | 10 | 6 | 48 | 4.7 | 97.5 |
| Com. Ex. 4 | " | AAc | 10 | 6 | 60 | AN | 10 | 24 | 30 | 2.0 | 75.0 |
| Com. Ex. 5 | " | AAc | 10 | 0.5 | 5 | AN | 10 | 24 | 55 | 5.5 | 60.0 |

*[1] tetrafluoroethylene - ethylene copolymer ("AFRON" by Asahi Chemical Industry Co., Ltd.)
*[2] polyethylene
*[3] methacrylic acid The foregoing description of the specific embodiments will so fully reveal the general nature of the invention that others can, by applying current knowledge, readily modify such specific embodiments without departing from the generic concept, and therefore such adaptations and modifications should and are intended to be comprehended within the meaning and range of equivalents of the disclosed embodiments. It is to be understood that the phrasiology or terminology employed herein is for the purpose of description and not of limitation.

What is claimed is:

1. A uranium adsorbing material made of a graft polymer with a graft ratio of 20 to 100% which contains amidoxime groups and cation exchange groups in a molar ratio of 1:1 to 3:1.

2. A process for producing a uranium absorbing material made of a graft polymer with a graft ratio of 20 to 100 percent which contains amidoxime groups and cation exchange groups in a molar ratio of 1:1 to 3:1, comprising preparing a graft polymer having first and second polymerizable monomers grafted on a substrate of a desired shape made of an organic, inorganic or composite material, by (A) first irradiating said substrate and then bring the irradiated substrate into contact sequentially with
  (1) at lease one first polymerizable monomer containing a cation exchange group or a functional group that can be converted into a cation exchange group and
  (2) at least one second polymerizable monomer containing a nitrile group which can be converted to an amidoxime group by reacting said monomer with an hydroxylamine, or (B) irradiating said substrate with an ionizing radiation while it is in contact with said polymerizable monomers sequentially;

reacting said graftmonomer with an hydroxylamine, and if the polymerizable monomer has a functional group capable of conversion to a cation exchange group, reacting said polymerizable monomer with an alkali, so as to introduce both amidoxime and cation exchange groups in the graft chain.

3. A process according to claim 2 wherein said polymerizable monomer containing a nitrile group is selected from the group consisting of, cyanated vinylidene, crotonnitrile, methacrylonitrile, chloroacrylnitrile, 2-cyanoethylacrylate and 2-cyanoethylmethacrylate.

4. A process according to claim 2 wherein the polymerizable monomer containing a cation exchange group or a functional group that can be converted to a cation exchange group has at least one member of the group consisting of a sulfonic acid group, carboxylic acid group, phenolic hydroxyl group and a phosphonic acid group, as well as an alkali metal salt, an alkyl ester, an acid chloride and an acid fluoride thereof.

5. A uranium adsorbing material in accordance with claim 1 wherein said graft polymer is grafted onto a pre-shaped substrate.

6. A uranium adsorbing material according to claim 5 wherein said substrate is inorganic and is selected from the group consisting of silica gel, alumina and activated carbon.

7. A uranium adsorbing material in accordance with claim 5 wherein said substrate is a polymer selected from the group consisting of polyolefins, halogen-containing polyolefins, polyesters, polyethers and celluloses.

8. A uranium adsorbing material in accordance with claim 5 wherein said pre-shaped substrate is in a form selected from the group consisting of particulate form, fibrous form, membrane form, tube form and rod form.

9. A uranium adsorbing material in accordance with claim 5 wherein said pre-shaped substrate has a form selected from the group consisting of webs, screens, twisted yarns and mats.

10. A uranium adsorbing material in accordance with claim 5 wherein said graft polymer consists essentially of segments containing said amidoxime groups and derived from a first polymerizable monomer, and segments containing said cation exchange groups and derived from a second polymerizable monomer.

11. A uranium adsorbing material according to claim 10 wherein said first polymerizable monomer is selected from the group consisting of acrylonitrile, cyanated vinylidene, crotonnitrile, methacrylonitrile, chloroacrylonitrile, 2-cyanoethylacrylate, 2-cyanoethylmethacrylate and mixtures thereof.

12. A uranium adsorbing material according to claim 10 wherein said second polymerizable monomer is selected from the group consisting of monomers having a sulfonic acid group, carboxylic acid group, phenolic hydroxyl group and a phosphonic acid group, as well as an alkali metal salt, an alkyl ester, an acid chloride and an acid fluoride thereof and mixtures thereof.

13. A process according to claim 2 wherein said substrate is irradiated with said ionizing radiation prior to contact with said first and second polymerizable monomers.

14. A process according to claim 2 wherein said substrate is first contacted with said polymerizable monomers and then subjected to said ionizing radiation.

15. A process according to claim 2 wherein said nitrile group of said first polymerizable monomer is converted to said amidoxime group by reaction with said hydroxylamine by immersing the grafted polymer in a solution of a hydroxylamine salt and heating at 40°–80° C. for 4–10 hours.

16. A process according to claim 2 wherein said first polymerizable monomer is grafted onto said substrate first, and said second polymerizable monomer is grafted onto said substrate thereafter.

* * * * *